(No Model.)
A. A. SHARP.
VEGETATION EXTERMINATOR.
No. 492,635. Patented Feb. 28, 1893.
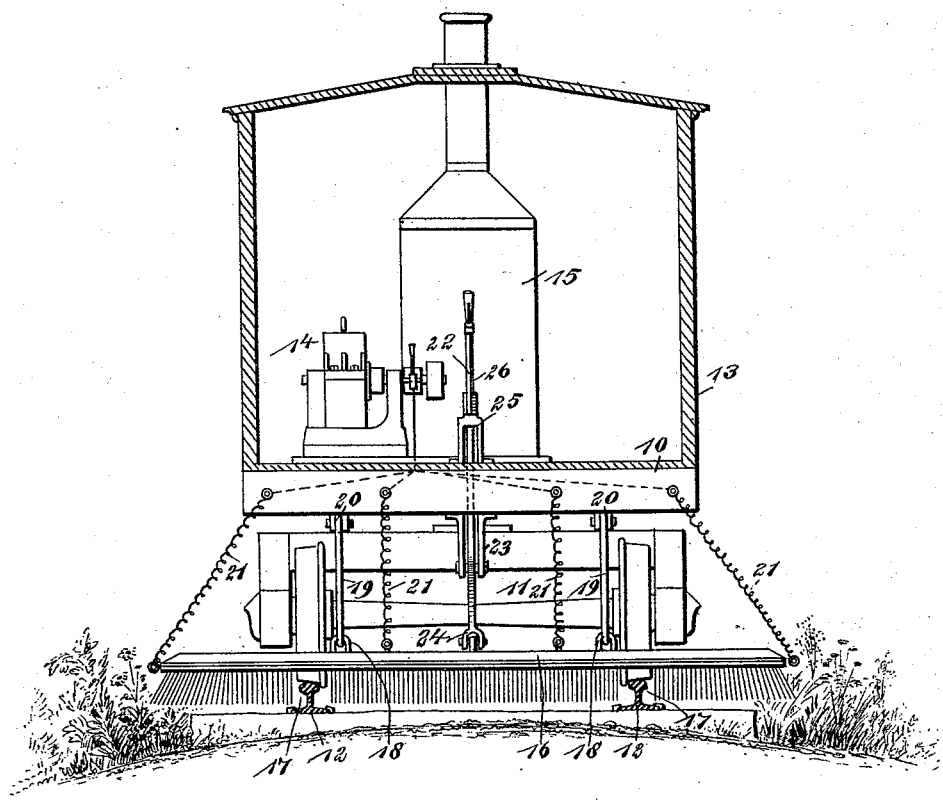
WITNESSES:
INVENTOR
BY
ATTORNEYS.

UNITED STATES PATENT OFFICE.

ALBERT A. SHARP, OF MEMPHIS, TENNESSEE.

VEGETATION-EXTERMINATOR.

SPECIFICATION forming part of Letters Patent No. 492,635, dated February 28, 1893.

Application filed June 29, 1892. Serial No. 438,384. (No model.)

*To all whom it may concern:*

Be it known that I, ALBERT A. SHARP, of Memphis, in the county of Shelby and State of Tennessee, have invented a new and Improved Vegetation-Exterminator, of which the following is a full, clear, and exact description.

My invention relates to improvements in devices for killing vegetation of all kinds; and the object of my invention is to produce a simple apparatus which may be coveniently applied to a car or other vehicle, and which when the car to which it is applied is moved along the track, or a vehicle is moved along the road, will cause a strong current of electricity to be sent through all the adjacent vegetation, thus killing the same. It is well known that in warm countries especially vegetation grows thick and rank upon railroad beds and highways, and an apparatus of this kind affords a convenient means of freeing the road-bed or highway of the obnoxious growth. The current is applied to the vegetation by means of a brush, and it will be understood that the same principle may be applied to the weeds and grasses of a cultivated field, thus killing them off and leaving the cultivated plants.

With these ends in view, my invention consists in certain features of construction and combinations of parts, which will be hereinafter described and claimed.

Reference is to be had to the accompanying drawing, forming a part of this specification, in which the figure represents a sectional elevation of the entire apparatus, as applied to a push car.

The apparatus forming my invention may be applied to any vehicle whatever, but to illustrate it I have shown it applied to a push car 10 which is mounted on a truck 11, and the latter is held to run on the track rails 12, of an ordinary railroad bed. The car is preferably provided with a covering or housing 13 to protect the portion of the apparatus carried upon it, and this apparatus includes an electric dynamo 14 which may be of any approved type, and an engine 15 for running the dynamo. If desired, batteries of some sort may be substituted for the dynamo, or any other means for supplying an electric current may be employed.

Suspended from the car and extending transversely across the track, is a metallic brush 16, the wires of which extend nearly to the ground and consequently come in contact with all vegetation on the road-bed. There are breaks in the wires opposite the rails, as shown at 17, so as to permit the brush to straddle the rails and run smoothly along the road. The brush has upon its back staples 18 to which links 19 are secured, and the latter are pivoted to the top of the truck, as shown at 20. The brush is connected by electric wires 21 with the dynamo 14, so that when the dynamo is started, the current will pass through the wires and brush and through the vegetation, in contact with the brush, to the ground. The brush is connected with a lever 22 which extends upward through an aperture in the car the lever being pivoted in lugs 23 on the car bottom and having its lower end pivoted to the center of the brush, as shown at 24. The lever is held to swing through a common form of quadrant 25 and is held in position by an ordinary spring bolt 26 which engages the quadrant. The quadrant and bolt are not shown in detail, as they are of the common kind and form no part of this invention and, moreover, any suitable mechanism may be substituted for the lever to raise the brush. The brush will normally drop into the position shown in the drawing, but by swinging the upper end of the lever backward, the brush may be raised so as to pass any obstruction on the track, such as a guard rail or a bridge.

It will be clearly understood from the foregoing description that the brush and the electric generator may be carried upon any suitable vehicle and used upon plantations for killing obnoxious vegetable growths.

Having thus described my invention, I claim as new and desire to secure by Letters Patent—

1. The combination with a vehicle, of a brush suspended from the vehicle and adapted to contact with adjacent vegetation, and electrical connections whereby a current of electricity may be sent through the brush, substantially as described.

2. The combination with a vehicle, of a brush suspended from the vehicle and adapted to contact with adjacent vegetation, a lever mechanism for raising the brush, and electrical connections whereby a current of electricity may be sent through the brush, substantially as described.

3. The combination with the vehicle, of a vertically adjustable brush suspended therefrom and adapted to contact with adjacent vegetation, and electrical connections between the brush and a source of electricity, substantially as described.

4. The combination with the vehicle, of a brush suspended from the vehicle and adapted to contact with adjacent vegetation, a lever mechanism for adjusting the brush vertically, an electric generator carried by the vehicle, and electrical connections between the generator and the brush, substantially as described.

ALBERT A. SHARP.

Witnesses:
JAS. M. EDWARDS,
CHARLES E. ARMSTRONG.